US005085933A

United States Patent [19]

Katoh et al.

[11] Patent Number: 5,085,933

[45] Date of Patent: Feb. 4, 1992

[54] FILM FOR USE AS THERMOSENSITIVE STENCIL PRINTING CARDBOARD SHEET

[75] Inventors: Kotaro Katoh; Hiroshi Tomita; Kazuyoshi Saitoh, all of Sagamihara, Japan

[73] Assignee: Tejin Limited, Osaka, Japan

[21] Appl. No.: 549,061

[22] Filed: Jul. 6, 1990

[30] Foreign Application Priority Data

Jul. 6, 1990 [JP] Japan ................................ 1-173088

[51] Int. Cl.[5] ................................ B32B 9/00

[52] U.S. Cl. ................................ 428/332; 428/337; 428/409; 428/480; 428/500; 428/913

[58] Field of Search ................ 428/95, 332, 337, 409, 428/480, 500, 913

[56] References Cited

U.S. PATENT DOCUMENTS 4,535,690 8/1985 Gestetner et al. ................ 428/192
4,766,033 8/1988 Yoshimura et al. ................ 428/332
4,981,746 1/1991 Matsuo et al. ................ 428/913

FOREIGN PATENT DOCUMENTS 2753038 6/1978 Fed. Rep. of Germany .

OTHER PUBLICATIONS

Patent Abstracts of Japan, vol. 13, No. 94 (M-804)(3442) Mar. 6, 1989, & JP-A-63 286395 (Toray Ind. Inc.) Nov. 24, 1988, *the whole document*.

*Primary Examiner*—Patrick J. Ryan

*Attorney, Agent, or Firm*—Wenderoth, Lind & Ponack

[57] ABSTRACT

A film for a thermosensitive stencil printing base sheet, comprising a biaxially stretched film of a thermoplastic resin having a thickness of 0.2 to 7 micrometers, said film showing at least two fusion peaks in its DSC temperature elevation measuring chart (the rate of temperature elevation 20° C./min.), at least two fusion peaks having the following relation:

$$T_{mp}(\max) \leqq 260(°C.)$$

$$T_{mp}(\min) \geqq 90(°C.)$$

$$\Delta T_{mp} \geqq 10(°C.)$$

$$5(cal/g) \leqq \Delta Hu(total) \leqq 13(cal/g)$$

$$0.05 \leqq \Delta Hu(min)/\Delta Hu(total) \leqq 0.9$$

wherein $T_{mp}(\max)$ is the temperature (°C.) of the fusion temperature on the highest temperature side, $T_{mp}(\min)$ is the temperature (°C.) of fusion peak on the lowest temperature side, $\Delta T_{mp}$ is $T_{mp}(\max) - T_{mp}(\min)$, $\Delta Hu(total)$ is the total fusion energy (cal/g), and $\Delta Hu(min)$ is the fusion energy (cal/g) of the fusion peak on the lowest temperature side.

14 Claims, No Drawings

FILM FOR USE AS THERMOSENSITIVE STENCIL PRINTING CARDBOARD SHEET

This invention relates to a film for use as a thermosensitive stencil printing cardboard sheet. More Specifically, it relates to a film for use as a thermosensitive stencil printing cardboard sheet which has a high printing sensitivity, is free from thickness unevenness and concentration unevenness, and permits clear plate making and printing.

In recent years, thermosensitive stencil printing has attracted attention which uses a base sheet to be stencilled and processed when undergoing heat by pulse irradiation such as a xenone flash lamp, a thermal head or a laser light. The principle of this processing is described, for example, in Japanese Patent Publication No. 7625/1966, Japanese Laid-Open Patent Publication No. 103957/1980, and Japanese Laid-Open Patent Publication No. 143679/1984.

In the past, a film for a thermosensitive stencil printing cardboard sheet laminated to a porous support by means of an adhesive or heat has been used as a cardboard sheet for use in thermosensitive stencil printing. Vinyl chloride films, vinylidene chloride copolymer films, polypropylene films, and highly crystalline polyethylene terephthalate films have been used as the thermosensitive stencil printing base films, and tissue paper or a polyester satin have been used as the porous support.

However, the thermosensitive stencil printing base sheets have the following defects.

1) When a polypropylene or a vinylidene chloride copolymer film is used, characters after printing do not come out clearly.

2) With a polypropylene or polyethylene terephthalate film, clear characters can be obtained, but clear solid printing cannot be obtained (printing of a symbol or a figure such as ● or ■ has a large area of ink adhesion cannot be obtained).

3) Dark and light areas appear in a printed portion.

4) Unevenness in the thickness of characters occurs.

5) The sensitivity is poor, and a light black color of light black characters do not develop well.

To eliminate these defects, Japanese Laid-Open Patent Publication No. 149496/1987, Japanese Laid-Open Patent Publication No. 253492/87, Japanese Laid-Open Patent Publication No. 282984/1987 and Japanese Laid-Open Patent Publication No. 227634/1988 suggest the use of a film having a low crystal fusion energy. Japanese Laid-Open Patent Publication No. 282983/1987 suggests a highly heat shrinkable film (100° C.×10 minutes, heat shrinkage at least 15 %) of a substantially amorphous thermoplastic resin. The former film having a low crystal fusion energy has production troubles such as the blocking of a polymer chip during drying and the tackifying of a longitudinally stretched film edge onto a clip in a tenter-type transverse stretching machine. Furthermore, with this type of film, during a stencil operation, the softened polymer tends to adhere to the thermal head and in a continuous plate-making, a streak-like reversal mark occurs owing to the polymer adhesion. In the latter case of highly shrinkable film when an excessive energy more than that sufficient for perforation is applied, the perforations tend greatly to increase excessively. As in a printing having a high perforation dot density as in solid printing, the remaining polymer deformed by heat perforation clogs the porous support and reversal occurs here and thereto decrease the printing density, when a heat-resistant, stick-preventing coating is applied to the film, or when a film is laminated to the porous support by means of an adhesive, the film may shrink by the solvent.

Japanese Laid-Open Patent Publication No. 286395/1988 discloses a film for a thermosensitive stencil printing cardboard sheet which is composed of a biaxially stretched film of at least two kinds of polyester-type resins having a difference in crystallization temperature of at least 20° C. and containing 1 to 3 % by weight of inorganic particles having a Morse hardness of 2.5 to 8. However, the film specifically disclosed in a working example of the above Laid-Open Patent Publication is a film obtained by melt-molding at 290° C. a blend of polyethylene terephthalate and an amorphous or nearly amorphous polyester (polyethylene terephthalate/isophthalate copolymer, polybutylene terephthalate/isophthalate copolymer. During this molding step, redistribution reaction took place to produce a film having a low crystallization energy having one fusion peak. This film can be said to substantially the same as the film described in Japanese Laid-Open Patent Publication No. 149496/1987. This film has the same defects as the film having a low crystal fusion energy as described in Japanese Laid-Open Patent Publication No. 149496/1987.

It is a main object of this invention to remove the defects of the film for thermosensitive stencil printing cardboard sheet discussed above, and to provide a film for a thermosensitive stencil printing base sheet which gives a clear printing of characters or solid printing, is free from printing thickness unevenness and also from a dark and light unevenness, and has excellent durability and sensitivity.

Other objects and advantages of the invention will become apparent from the following description.

According to this invention, there is provided a film for a thermosensitive stencil printing base sheet, said film being composed of a biaxially stretched film of a thermoplastic resin having a thickness of 0.2 to 7 micrometers, wherein the film shows at least two fusion peaks in a DSC temperature elevation measurement chart (at a temperature elevation rate of 20° C./min.) and at least the two fusion peaks have the following relation $$T^{mp}(\text{max}) \leqq 260\ (°\text{C.})$$

$$T^{mp}(\text{min}) \geqq 90\ (°\text{C.})$$

$$\Delta T_{mp} \geqq 10\ (°\text{C.})$$

$$5(\text{cal/g}) \leqq \Delta Hu\ (\text{total}) \leqq 13\ (\text{cal/g})$$

$$0.05 \leqq \Delta Hu(\text{min})/\Delta Hu\ (\text{total}) \leqq 0.9$$

when $T_{mp}$ (max) is the fusion peak temperature (°C.) on the highest temperature side, $T_{mp}$ (min) is the fusion peak temperature (°C.) on he lowest temperature side, $\Delta T_{mp}$ is $T_{mp}$ (max) − $T_{mp}$ (min)

$\Delta Hu$(total) is the total fusion energy (cal/g), and $\Delta Hu$(min) is the fusion energy (cal/g) of the fusion peak on the lowest temperature side (cal/g).

In the present specification, the "thermosensitive stencil printing base sheet" is perforated and processed by undergoing heat by a xenone flash lamp, thermal head or laser light, and generally it is composed of a film for a thermosensitive printing base sheet and a porous support laminated thereon film for a thermosensitive printing base sheet (to be referred to as a thermosensitive film), when making a contact with a flash irradiation or a thermal head, forms parts corresponding to characters of printing base sheets which will be stenciller.

The perforation step of the thermosensitive film may be divided in three steps.

1) That portion to which a thermal energy has been impressed by contact with a thermal head or by irradiation of an electromagnetic wave (a xenon flash lamp light, a laser pulse, etc) is softened and melted and consequently, an origin of a pore is formed.

2) The thermal energy so applied diffuses through and shrink the polymer around the original of pores. The polymer around the formed originals of pores is thermally melted and increases the pores.

3) The melted polymer is attracted around the pores by thee thermal shrinking by spontaneous cooling and radiation. Thus, end portions of the pores are formed, and the shape of the pores is maintained.

The thermosensitive film of this invention is characterized in that it has two or more fusion peaks. By having a fusion peaks in a relatively low temperature region, a starting point of forming pores can be easily made. By having a fusion peak in a high temperature side, the expansion of the pores and the maintenance of the shape of pores can be easily effected. As a result, a thermosensitive stencil printing cardboard is provided which has a high printing sensitivity, is free from thickness unevenness and dark and light unevenness and can give a clear plate-making and printing.

The thermosensitive film used in a thermosensitive stencil printing cardboard sheet in accordance with this invention is a biaxially stretched thermoplastic resin film having a thickness of 0.2 to 7 micrometers, preferably 0.5 to 5 micrometers, more preferably 0.8 to 3.5 micrometers. The degree of biaxial stretching of the film is not strictly limited, and may be varied depending upon the type of the resin which forms the film. Generally, the film is biaxially stretched so that it has a planar orientation coefficient of 0.90 to 0.98, preferably 0.91 to 0.98, especially preferably 0.93 to 0.97.

The biaxially stretched film in accordance with this invention is essentially characterized in that it has at least two fusion peaks (to be referred to as a fusion peak) in a DSC temperature elevation measurement chart (DSC differential scanning calorimetry) under such conditions that the rate of temperature elevation is 20 °C./min. The measurement chart does not have to be drawn on a recording sheet. For example, it may be temporarily shown on a display face which can form part of the measuring device. The fusion peak defined as a peak which includes no shoulder and has a clearly distinguishable minimum point as apex.

Furthermore, in the thermosensitive film in accordance with this invention, at least two fusion peaks should satisfy the conditions shown by the following formulae (1) to (5).

$$T_{mp}\,(\max) \leqq 260\ (°C) \quad (1)$$

$$T_{mp}\,(\min) \geqq 90\ (°C.) \quad (2)$$

$$\Delta T_{mp} \leqq 10\ (°C.) \quad (3)$$

$$5\,(cal/g) \leqq \Delta Hu\ (total) \leqq 13\ (cal/g) \quad (4)$$

$$0.05 \leqq \Delta Hu(\min)/\Delta Hu\ (total) \leqq 0.9 \quad (5)$$

wherein $T_{mp}$ (max) is the temperature (°C.) of a fusion peak on the highest temperature side, $T_{mp}$ (min) is the temperature (°C.) of a fusion peak on the lowest side;

$\Delta T_{mp}$ is $T_{mp}$(max) − $T_{mp}$(min)

ΔHu (total) is the total fusion energy (cal/g), and

ΔHu(min) is a fusion energy on the lowest temperature side.

In the thermosensitive film of this invention, $T_{mp}$(max) of a fusion peak which is located on the highest temperature side is not more than 260 ° C., preferably not more than 250°°C., more preferably not more than 240° C. If $T_{mp}$(max) is higher than 260° C., the sheet obtained tends to have insufficient perforating ability and decreased sensitivity.

On the other hand, the temperature of the fusion peak which is located at the lowest temperature side is at least 90° C., preferably at least 100° C., more preferably at least 110° C.. If the temperature is lower than 90° C. the softened polymer tends to adhere to the thermal head, and may give rise to a problem in the printing quality. At the time of perforation by flash irradiation under the above condition, sticking of the film to the document tends to occur undesirably.

In the thermosensitive film of this invention, of two or more fusion peaks, the difference between the fusion peak temperature of the highest temperature side Tmp (max) and the fusion peak temperature $T_{mp}$ (min) on the lowest temperature side is at least 10° C., preferably at least 20° C., especially at least 30° C.. If this is less than 10° C., the perforation characteristics tend to be insufficient.

Preferably, the thermosensitive film of this invention has a total fusion energy (ΔHu(total)) of 5 to 13 cal/g, further 5 to 12 cal/g, especially 7 to 11 cal/g. With a film having a total fusion energy of less than 5 cal/g. the sticking of the polymer to the thermal head or the document tends to occur, and it is difficult to obtain sufficient mechanical strength and solvent resistance and the film is difficult to withstand the operation of laminating to the porous support and the operations during printing. With a film having a ΔHu (total) of more than 13 cal/g, sufficient perforating characteristics cannot be obtained, and the film tends to give a base sheet having poor sensitivity.

Preferably, in the thermosensitive film of this invention, the proportion of the fusion energy ΔHu (min) of the fusion peak on the lowest temperature side to the total fusion energy ΔHu (total) is 0.05 to 0.9. If the proportion is less than 0.05, generally sufficient perforatability cannot be obtained by the application of a thermal energy for a short period time or the amount of energy applied is low. On the other hand, with a film having the above proportion of more than 0.9, if an excessive thermal energy above that sufficient for perforation is applied, it is difficult to maintain the shape of pores, and the deformed polymer may clog the porous support to reduce the density of the printed characters, and a sufficient strength as a thermosensitive film cannot be obtained. The proportion of ΔHu (min)/ΔHu (total) is conveniently 0.15 to 0.8, especially 0.3 to 0.7.

Desirably, the thermosensitive film in accordance with this invention has thermal shrinkability. For example, its thermal shrinkage at a temperature from the highest temperature of the fusion peak temperature $T_{mp}$ (max) to a temperature 20° C. below it, namely Tmp (max)−20° C.), may be at least 10%, preferably 15 to 60%, more preferably 210 to 50%, The thermal shrinkage herein denoted is an average thermal shrinkage of the film in the longitudinal direction and in the transverse direction. Desirably, the thermosensitive film in accordance with this invention has a mechanical strength which withstands loads encountered during processing, handling and printing of Stencil cardboard sheet. The above film generally has a tensile modulus of at least 100 $kg/mm^2$, preferably at least 150 $kg/mm^2$, more preferably.at least 200 $kg/mm^2$. The tensile modulus of the film is an average age of its tensile modulus in the longitudinal direction and that in the transverse direction.

The thermosensitive film of this invention may have some degree of surface roughness at least at the film surface which is to be in contact with the thermal head. Its surface roughness is expressed by a centerline average roughness (Ra) measured by a non-contacting three-dimensional roughness tester, and may generally be 10 to 100 nm, preferably 20 to 80 nm, more preferably 25 to 60 nm.

The thermosensitive film of this invention can be advantageously prepared by melt-molding a blend of at least two thermoplastic polymers having different fusion peak temperatures ($T_{mp}$, ° C.)

Examples of thermoplastic polymers which can be used for such film production include polyolefins such as polyethylene, polypropylene, ethylene-propylene copolymers, ethylene-vinyl acetate copolymer, polybutadiene, polystyrene and poly(methylpentene); polyesters typified by polyethylene terephthalate, polyethylene terephthalate-isophthalate copolymer, polybutylene terephthalate polybutylene telephthalate-isophthalate copolymer, polyhexamethylene terephthalate, polyhexamethylene terephthalate-isophthalate copolymer, polyethylene-2,6-naphthalate, polyethylene- alpha,beta-bis-(2-chlorophenoexy)ethane-4,4-dicarboxylate, and polycarbonate; halogenated polymers typified by polyvinylidene chloride, polyvinylidene fluoride and polyvinyl fluoride; polyamides typified by polyhexamethylene adipate (nylon 66), poly-epsilon-caprolactam (nylon 6), and nylon 610; vinyl polymers such as polyacrylonitrile and polyvinyl alcohol; and polyacetal, polyether sulfone, polyether ketone, polyphenylene ether, polysulfone and polyphenylene sulfide. As at least two thermoplastic polymers used to prepare a polymer blend, it is advantageous to select and combine at least two polymers having a temperature difference of at least 10° C., preferably 20 to 130° C., more preferably 30 to 100° C. In particular, it is preferable to combine aromatic polyesters having a temperature difference of $T_{mp}$ of 265 to 140° C., preferably 255 to 190 °C., and other thermoplastic polymers having a temperature difference Tmp of 90 to 230° C., preferably 130 to 225° C. The above aromatic polyesters may be polyethylene terephthalate, polybutylene terephthalate, polyethylene 2,6-naphthalene dicarboxylate, polybutylene-2,6-naphthalene dicarboxylate, polyhexamethylene terephthalate, and copolyesters resulting from not more than 15 mole % of these dicarboxylic acid component being other aromatic dicarboxylic acid components or non-aromatic dicarboxylic acid components, and/or not more than 15 mole % of other diol components. Typical examples of other thermoplastic polymers are, for example, polybutylene terephthlate, polyhexamethylene terephthalate and its copolymers as aromatic polyesters; polyethylene, polypropylene, ethylene-propylene copolymer, ethylene/vinyl acetate copolymer, and poly(-methyl pentene) as polyolefin, and nylon 6, nylon-66 and nylon MXD6 as polymides; and halogenated polymers such as polyvinylidene chloride and polyvinylidene fluoride. Of these, the aromatic polyesters are preferred.

The production of the thermosensitive film of the invention from thermoplastic polymers may be performed by a melt-molding method known per se. Specifically, two or more thermoplastic polymers are fully dried and fed into an extruder, fully melting and kneading the polymers there and extruding the mixture from a slit die (such as a T-die), or forming a film from the molten mixture by an inflationasting method, and biaxially stretching the resulting film by an ordinary method.

When at least two polyesters are used as the at least two thermoplastic polymers, during the melt kneading, redistribution reaction of a polyester tends to occur. If such a reaction may possibly occur, it is desirable to control the reaction so by adjusting the melt-kneading conditions so that such a reaction does not excessively proceed.

To prevent an excessive redistribution reaction, it is suitable, for example to (a) select those thermoplastic polymers which do not easily induce a redistribution reaction, (b) to minimize the residence temperature and to shorten the residence time as much as possible after the melting, or to (C) to add a stabilizer to deactivate the catalyst in the thermoplastic polymer Blend of polyesters with each other having a $T_{mp}$ difference of at least 10° C. is taken up and will be described. If a blend of polyethylene terephthalate (PET) and polybutylene terephthalate (PBT) in a weight percent ratio of 50:50 is melt-molded at a melting temperature of 280° C., a residence temperature of 250° C. with a residence time of 20 minutes, the resulting film has two fusion peaks at 204° C. and 237° C. but when the same blend is melt-molded at a melting temperature of 300° C., a residence temperature of 300° C. with a residence time of 150 minutes, the resulting film has one fusion peak at 176° C. and the fusion energy becomes 3 cal/g, and the product completely becomes a random copolymer. If a blend of 33.3% by weight of polyethylene terephthalate isophthalate copolymer and 66.7% by weight of PET is melt-molded at a melting temperature of 280° C. with a residence temperature of 250° C. with a residence time of 20 minutes, the resulting film has one fusion peak at 230° C., and the DSC curve of this polymer is much the same as that of polyethylene terephtalate isophthalate copolymer having copolymerized 12% by weight of isophthalate. It is presumed that the resulting film is nearly a random copolymer. A blend of polyethylene terephthalate isophthalate copolymer with PET with varying proportions of isophthalate has only one fusion peak under the above extrusion conditions.

From the foregoing, by performing melt-molding in view of the items (a) and (b), a film having two or more fusion peaks can be obtained.

When a combination of non-compatible polymers is used, it is desirable that another polymer is dispersed uniformly in a major amount of a polymer matrix, and the average particle diameter of the dispersed phase may be generally not more than 20 micrometers, preferably not more than 10 micrometers. The average particle diameter of the dispersed phase is determined by taking a photograph of the cut section of the film through a scanning electron microscope at a desired magnification (for example, 2000 to 10000 X), or dyeing one phase with a dye such as ruthenium teraoxide and photographing an ultrathin sample of the dyed phase at a magnification of 2000 to 10000 X), and determining the average particle diameter from the photograph. Film formation may be carried out by solution casting method. In film formation, the releasability of the film from the support may be improved by kneading coating a wetting agent (such as a higher fatty acid or its acid ester, more specifically ethylene glycol ester of montanic acid, ethyl montanate, montan wax or carnauba wax, or a surface-active agent such as lithium alkylbenzenesulfonate, more specifically lithium dodecylbenzenesulfonate) or coating them on the film surface.

To improve the slipperiness of the thermosensitive film, various natural or synthetic organic or inorganic fine powders, such as calcium carbonated, silica (silicon dioxide), kaolinite (aluminum silicate), titanium dioxide, aluminum trioxide and calcium phosphate, and organic particles such as silicone resinfine particles, and fine particles of crosslinked polystyrene resins may be incorporated into the film. Preferably, the fine particles have a particle diameter of 0.2 to 3 micrometers. The amount of the fine particles to be added is 0.10 to 2.0% by weight. It is also possible to incorporate additives having an absorption peak in a wavelength region for irradiating flash light.

The biaxially stretching method of the molded film is not particularly limited. For example, there may be used consecutive biaxial stretching or simultaneous biaxial stretching method (e.g. stenter method).

The biaxially stretched film so obtained may be heat-treated properly. The heat-treating conditions are not particularly limited. Usually, it may be carried out at 80 to 250° C. with a relaxation rate of not more than 20 %.

The surface of the thermally sensitive film so produced may be subjected to corona discharge treatment in air, carbon dioxide gas or nitrogen gas.

The thermally sensitive film of this invention may be laminated to a porous support in an ordinary method to form a thermosensitive stencil printing cardboard sheet.

The porous support to which the thermosensitive film of the invention is to be laminated is not limited in particular, and it may be any of those materials which have been so far used, and may include, for example, Japanese paper, synthetic fiber sheet-formed paper, various woven fabrics and non-woven fabrics. The basis weight of the porous support is not particularly limited. Usually, it is 2 to 20 kg/$m^2$, preferably 5 to 15 g/$m^2$. When a mesh-like sheet is used, it is suitable to use a fabric woven from fibers having a size of 20 to 60 micrometers. The lattice spacing of the fabric is preferably 20 to 250 micrometers.

The adhesive to be used to laminate the thermosensitive film to the porous support is not particularly limited. Examples of the adhesive are those having a vinyl acetate resin, acrylic resins, urethane resins, and polyester resins as a tackifying component.

The present invention will be described in greater detail by the following examples, but it should be understood that the present invention should not be limited to these Examples unless it departs from the scope of the invention described herein.

The various characteristic values (parameters) and properties are measured by the following methods or defined herein.

(1) DSC temperature elevation measuring chart and fusion peak temperature $T_{mp}$ (°C.)

(1—1) Device

Thermal analysis system SSC580, DSC20, Seiko Electronics Co., Ltd.

(1-2) Measuring conditions

Temperature elevation rate: 20° C./min. in $N_2$ current (1-3) Film sampling

Two films having a size of 20 cm×20 cm were laid over each other, and folded into 16 equal parts. The central part of the films was punched out by a punching machine (diameter 6 mm). The punched films were collected at random to a weight of 10 mg.

(1-4) How to seek the fusion peak temperature

In accordance with JIS 7121-1987, the temperature at the a pex of the fusion peak temperature is defined as a fusion peak temperature. The fusion peak, herein, is defined as a peak which does not contain a shoulder and has a minimum point which can be clearly distinguished as an apex.

(2) Fusion energy Hu (cal/g)

(2-1) Total fusion energy Hu (total) (cal/g)

Ten mg of the film sample sampled as in (1-3) as set in a thermal analysis system SSC580, DSC 20, and heated in an $N_2$ at a temperature elevating rate of 20° C../min. The total fusion energy was determined from the area of the fusion on the DSC chart corresponding to the endothermic energy resulting from the fusion of the film. This DSC chart curve was deviated to the endothermic side from the base line by elevating the temperature. When the temperature is further elevated, and after passing through the fusion peak on the highest temperature side, the curve of endothermic side returns to the position of the base line. The position of fusion starting temperature and the position of the end of the fusion is connected by a straight line and the area (a) (i.e., the area surrounded by the curve and the straight line) was sought. Under the same measuring conditions of DSC, In (indium) is measured and this area (b) was defined as 6.8 cal/g. By using area (a) and area (b), Hu(total) can be calculated from the above formula.

$$\Delta Hu(total)=(a/b)\times 6.8 \text{ (cal/g)}$$

(2—2) The fusion energy Hu(min) (cal/g) of the fusion peak on the lowest temperature side The endothermic peak obtained by the method of (2-1) fusion peak temperatures ($T_{mp}$ (min))...., $T_{mp}$ (max)) were divided into a Gauss curve area (c) surrounded by the Gauss curve of a peak in the lowest temperature side and the base line was determined. ΔHu(min) was determined from the following formula as in (2-1).

$$\Delta Hu(min.)=(c/b)\times 6.8 \text{ (cal/g)}$$

Hence, $$\Delta Hu(min)/\Delta Hu(total)=c/a$$

(3) Film thickness

When a film having a thickness of (micrometers) is sampled with a width W (cm) and a length 1 (cm), the thickness is calculated from the following formula in which the density is d(g/$cm^3$) and the G is the weight in gram of this sample.

$$t = \frac{G}{W \cdot l \cdot d} \times 10{,}000$$

(4) Intrinsic viscosity [$\eta$] Measured at 25° C. using orthochlorophenol. The unit is 100 cc/g.

(5) Planar orientation coefficient

A film having a refractive index of Nz in the thickness direction was maintained at a temperature higher than its melting point by 50° C. for 5 minutes while the film was held by glass sheets so that its surface did not become uneven. Then the sample was taken out, and its refractive index of Nzo in the thickness direction was obtained. The planar orientation coefficient was determined from the formula Nz/Nzo.

The refractive index was measured by an Abbe refractometer.

(6) Thermal shrinkage

A film sample having a size of 350 mm×350 mm was used an indicator lines were put. The such samples were suspended under no tension in a constant temperature vessel of the hot air type (produced by Tester Sangyo Co., Ltd.), and maintained for 30 minutes. The distance between the indicator lines was again measured, and the thermal shrinkage was calculated from the following formula, and an average value of n=10 was obtained.

$$\text{Thermal shrinkage (\%)} = \frac{L_o - L}{L_o}$$

wherein $L_o$ is the original length which is the distance between the indicator lines which is 300 mm, and L is the length in mm after the testing.

Tensile modulus (Young's modulus (kg/cm$^2$).

The film was cut to a sample width of 10 mm, and a length of 15 cm. With a chuck distance of 100 mm. The film was pulled by a instron type universal tensile tester at a pulling rate of 10 mm/min and at a chuck speed of 100 mm/min. From the tangent of the rising portion of the resulting load-elongation curve, the tensile modulus (Young's modulus) is calculated.

(8) Surface roughness (Ra)

It is a value defined in JIS-B0601 as a centerline average roughness (Ra). In this invention, it is measured by a non-contacting type centerlike average roughness meter (ET-30HK made by Kosaka Kenkyusho Co., Ltd.) (Ra). The measuring conditions were as follows.

(a) Laser: semiconductor laser wavelength 780 nm
(b) Laser beam diameter: 1.6 micrometers
(c) Cut off: 0.25 mm
(d) Measuring length (Lx): 1 mm The profiles of protrusions on the film surface were measured under conditions involving a longitudinal direction enlarged magnification 10000 times, a lateral direction of 200 times, a sampling pitch of 2 micrometers number of scanning protrusions of 100 (the measuring length Ly-0.2 mm in the Y direction. When its roughness curved surface is expressed by Z=f(x,y), a value given by the following formula (Ra; micrometer) is defined as the film surface roughness.

$$Ra = \frac{1}{L_x \times L_y} \int_0^{L_x} \int_0^{L_y} |f(x,y)| d_x d_y$$

The protruding height at a point where the area ratio from the reference level is 70% is regarded as being of a 0-level, and the height of a protrusion is defined as the difference between it and the protruding height at the 0-level. The number of protrusions corresponding to this height is read.

(9) Evaluation of letter printing (9-1) Evaluation of the clearness of characters Characters according to JIS First Standards were prepared on a base sheet (manuscript) having a character size of 2.0 mm square and a combination of a porous support of a polyester gauze and a thermosensitive film (both in an example and in a comparative example. As a flash irradiation method this combination was processed and printed by using "RISO namecard playing processor and printing press. As a thermal head method the above combination was processed and printed by using a digital printer PRIPORT SS950 (made by Richo Co., Ltd. In each of Examples and Comparative Examples, the results which were worse between the flash irradiation stencil method and the thermal head stenciling method were shown.

Evaluation was performed by the naked eye visual observation on a scale of A to C in which A means that the printed characters were seen as in the base sheet. B means that unlike the base sheet, the characters were partly cut or got together; and C which means that the characters were cut or got together almost to the state where they were unreadable.

(9-2) Evaluation of skipping characters

The processing and printing were carried out as in (9-1), and skipping of characters was evaluated.

If there are apparently missing portions was indicated as being unusable and shown by X mark. Where the characters are slightly missing (to a readable extent) although they are not completely missing, the evaluation is shown by mark Δ.

(9-3) Evaluation of the thickness unevenness of the characters

By using the same processing machine and the printer as used in (9-1), characters having a character size of 5.0 nm square were printed, and the state of printing was evaluated with the naked eye.

Where in comparison with letters in the base paper (manuscript), there were apparently thickness unevenness, they were evaluated as being unusable because of a poor appearance (X) (mark X). Characters which had not thickness unevenness are evaluated as having a good appearance and being usable and shown by mark ○.

(9-4) Evaluation of the thickness of characters

As in (9-3) the same plate making and printing were performed, and variations in the thickness of characters were evaluated. Characters which were apparently finer or thicker with those of the document were regarded as being unusable, and indicated by mark X. Those which showed no change in thickness were indicated by mark ○. Those which were slightly thicker or finer were regarded as being usable, and shown by a triangular mark (Δ)

(10) Evaluation of the clearness of solid printing

A base sheet having ● (circle painted black) with 1 to 5 mm in diameter was used, and a plate was prepared and printing was performed by using it was evaluated as follows: The size of the base paper was used as a standard, and prints were evaluated by the (partial) unevenness of contruders Prints which had raised and depressed portions more than 200 micrometers than the base sheet size were regarded as having a poor appearance were indicated by X mark showing unclearness.

Prints having unevenness of less than 50 micrometers with raised and depressed portions were regarded as being clear and indicated by ○ mark. Prints intermediate between these are indicated by a triangular mark Δ. Depending upon the manner of using, prints marked by Δ can also be used.

(10-2) Correspondence of solid printing to the base paper size

Printing was made in the same way as in (10-1), and sizes in all directions (at the positions 0° and 180°, 45° and 225°, 90° and 270°, and 135° and 315°, and the correspondence to the size of the base sheet was evaluated. Where the sizes were 500 micrometers or more different from the base sheet size (larger or smaller), the correspondence was indicated by X mark showing poor correspondence. Where the size was 50 micrometers or less, the correspondence was regarded as being good and this evaluation is shown by a circle mark. Where the correspondence is between the two, the evaluation is shown by a triangular mark, and this type of printing can be used depending upon the use.

(10-3) Evaluation of dark and light unevenness of solid printing

Printing was performed as in (10-1), and it was evaluated with the naked eye that where there is a dark and light unevenness, the evaluation was shown by X mark; wherein there is no dark and light unevenness, the evaluation was indicated by ○.

(11) Evaluation of sensitivity

Five types of pencils having hardnesses of 5H, 4H, 3H, 2H and H were prepared, and letter were written with these pencils at a depressing pressure of 150 g. By using the resulting manuscript, it was evaluated whether the letter could be read. When the letters were written with a 5H pencil, the color was most light and the sensitivity was best. With smaller H numbers, the black color was deeper, and the sensitivity was worse.

(12) Evaluation of durability

The thermosensitive film was printed on the above-mentioned printing press, and the number prints which could be formed until the thermosensitive film broke was counted and made the number of printable copies.

EXAMPLES 1 TO 8 AND COMPARATIVE EXAMPLES 1 to 12

As shown in Table 1, the following resins were used.

Polyethylene terephthalate (PET for short) having an intrinsic viscosity of 0.65, polybutylene terephthalate (PBT for short) having an intrinsic viscosity of 1.10, polyethylene-2,6-naphthalene dicarboxylate (PEN) having an intrinsic viscosity of 0.65, polyethylene terephthalate-isophthalate copolymers having an ethylene isophthalate content of 12, 18 and 24% by weight abbreviated respectively as $PET/I^{12}$, $PBT/I^{18}$, and $PET/I^{24}$, respectively having an intrinsic viscosity of 0.65, a blend of polyethylene terephthalate copolymer (abbreviated as $PET/I^{40}$) having an ethylene isophthalate content of 40% by weight and PET in a weight ratio of 65:35. Blends of PET and PBT in a weight ratio of 75/25, 65/35, 50/50, 40/60, 30/70, 20/80 and 50/50, a blend of PET and polybutylene terephthalte-isophthalate copolymer having an isophthalic acid component of 40% by weight (based on the total acid component) and an intrinsic viscosity of 0.78 (abbreviated as $PBT/I^{40}$) in a weight ratio of 80:20, a blend in a weight ratio of 60:40 of PET and polyhexamethylene terephtahalate-isophthalate copolymer (abbreviated as $PHMT/I^{10}$) containing 10% by weight of hexamethylene isophthalate, a blend in a ratio of 50/50 of polybutylene terephthalate isophthalate copolymer (abbreviated as $PBT/I^{5}$) having an intrinsic viscosity of 1.10 and having an isophthalic acid content of 5% by weight based on the total acid component) and polyhexamethylene terephthalate (abbreviated as PHMT) having an intrinsic viscosity of 1.30, a blend in a weight ratio of 70:30 of PET and polyethylene glycol (abbreviated as PEG 20000); with an average molecular weight of 20,000, and a blend obtained by sufficiently kneading 40 parts of polypropylene (PP for short) having a melt flow rate of 3.0 with 60 parts of PET and blending PET with the resulting master polymer in a weight ratio of 50:50. These polymers were used as shown in Table 1. In all of these Examples and Comparative Examples, spherical silica particles having an average particle diameter of 1.5 microns was added to the film in a proportion of 0.40% by weight. Each of the polymers used was fully dried, and fed to an extruder, and melt-extruded at a temperature of 245 to 310° C.. The extruded film was cooled and solidified on a casting drum having a surface temperature of 20° C. by electrostatic to form an unstretched film. In Comparative Example 10, the molten polymer was extruded at a temperature higher than the extrusion temperature of Example 2 by 20° C..

The unstretched film was stretched to 3.2 to 3.7 times longitudinally ant to 3.5 to 4.0 times consecutively by selecting the stretching temperature from 50 to 130° C.. The drawn film was once cooled, and heat-treated at 100 to 150° C. while permitting a 2% relaxation.

TABLE 1

| | Film composition | | | Inert particle | | | Melting temperature | Residence temperature | Residence time |
|---|---|---|---|---|---|---|---|---|---|
| | Polymer A | Polymer B | Mixing ratio (A/B) | Type | Average particle diameter (mμ) | Amount added (wt. %) | (°C.) | (°C.) | (min.) |
| CEx-1 | PET | — | 100/— | Spherical silica | 1.50 | 0.40 | 280 | 280 | 20 |
| CEx-2 | PBT | — | 100/— | Spherical silica | " | " | 280 | 280 | 20 |
| CEx-3 | PEN | — | 100/— | Spherical silica | " | " | 300 | 290 | 20 |
| CEx-4 | $PET/I^{12}$ | — | 100/— | Spherical silica | " | " | 250 | 250 | 20 |
| CEx-5 | $PET/I^{18}$ | — | 100/— | Spherical silica | " | " | 250 | 250 | 20 |
| CEx-6 | $PET/I^{24}$ | — | 100/— | Spherical silica | " | " | 250 | 250 | 20 |
| CEx-7 | PET | PET/ | 65/35 | Spherical | " | " | 290 | 290 | 20 |

TABLE 1-continued

| | | | | | | | | | |
|---|---|---|---|---|---|---|---|---|---|
| | | $I^{40}$ | | silica | | | | | |
| CEx-8 | PET | PBT | 75/25 | Spherical silica | " | " | 280 | 250 | 20 |
| Ex-1 | PET | PBT | 65/35 | Spherical silica | " | " | 280 | 250 | 20 |
| Ex-2 | PET | PBT | 50/50 | Spherical silica | " | " | 280 | 250 | 20 |
| Ex-3 | PET | PBT | 40/60 | Spherical silica | " | " | 280 | 250 | 20 |
| Ex-4 | PET | PBT | 30/70 | Spherical silica | " | " | 280 | 250 | 20 |
| CEx-9 | PET | PBT | 20/80 | Spherical silica | " | " | 280 | 250 | 20 |
| CEx-10 | PET | PBT | 50/50 | Spherical silica | " | " | 300 | 270 | 100 |
| CEx-11 | PET | PBT/ $I^{40}$ | 80/20 | Spherical silica | " | " | 290 | 290 | 20 |
| Ex-5 | PET | PHMT/ $I^{10}$ | 60/40 | Spherical silica | " | " | 280 | 265 | 20 |
| Ex-6 | PEN | PBT | 50/50 | Spherical silica | " | " | 300 | 280 | 20 |
| Ex-7 | PBT/15 | PHMT | 50/50 | Spherical silica | " | " | 250 | 235 | 20 |
| CEx-12 | PET | PEG# 20000 | 70/30 | Spherical silica | " | " | 280 | 280 | 20 |
| Ex-8 | PP/PET = 40/60 | PET | 50/50 | Spherical silica | " | " | 280 | 280 | 20 |
| CEx-13 | PET | PBT | 50/50 | Kaolinite | 0.7 | 0.20 | 280 | 250 | 20 |
| CEx-14 | PET | PBT | 50/50 | Spherical silica | 2.50 | 2.00 | 280 | 250 | 20 |

| | Tmp | | | ΔHu | | Planar orientation | 150° C. × 30 min. Thermal | Tensile modulus | |
|---|---|---|---|---|---|---|---|---|---|
| | Tmp (min.) (°C.) | Tmp (max.) (°C.) | ΔTmp (°C.) | ΔHu (total) (cal/g) | ΔHu(min.)/ ΔHu(total) | coefficient | shrinkage (%) | (kg/ $cm^2$) | Ra (nm) |
| CEx-1 | — | 252.7 | — | 10.81 | — | 0.943 | 21.2 | 564 | 34.8 |
| CEx-2 | — | 221.0 | — | 12.38 | — | 0.944 | 23.2 | 245 | 33.5 |
| CEx-3 | — | 261.9 | — | 7.99 | — | 0.942 | 24.7 | 570 | 34.2 |
| CEx-4 | — | 224.0 | — | 8.99 | — | 0.948 | 23.0 | 525 | 34.5 |
| CEx-5 | — | 206.1 | — | 7.22 | — | 0.955 | 21.0 | 488 | 34.1 |
| CEx-6 | — | 193.8 | — | 6.57 | — | 0.962 | 26.0 | 464 | 34.9 |
| CEx-7 | — | 217.4 | — | 8.34 | — | 0.946 | 22.6 | 528 | 33.9 |
| CEx-8 | — | 242.1 | — | 9.41 | — | 0.944 | 24.0 | 442 | 33.8 |
| Ex-1 | 198.3 | 239.9 | 41.6 | 9.45 | 0.08 | 0.944 | 23.2 | 405 | 33.6 |
| Ex-2 | 204.4 | 236.5 | 32.1 | 9.55 | 0.35 | 0.943 | 22.8 | 371 | 34.0 |
| Ex-3 | 210.5 | 233.5 | 23.0 | 10.28 | 0.55 | 0.945 | 22.2 | 332 | 33.5 |
| Ex-4 | 213.3 | 231.8 | 18.5 | 10.30 | 0.70 | 0.942 | 22.1 | 306 | 33.7 |
| CEx-9 | 215.9 | 228.0 | 12.1 | 11.27 | 0.93 | 0.942 | 23.1 | 299 | 33.0 |
| CEx-10 | 193.8 | 214.4 | 20.6 | 4.71 | 0.40 | 0.958 | 24.5 | 306 | 34.1 |
| CEx-11 | — | 238.4 | — | 9.65 | — | 0.948 | 24.0 | 428 | 32.4 |
| Ex-5 | 125.3 | 252.4 | 127.1 | 10.50 | 0.25 | 0.954 | 20.8 | 428 | 34.5 |
| Ex-6 | 216.4 | 257.6 | 41.2 | 10.62 | 0.40 | 0.956 | 22.4 | 437 | 32.7 |
| Ex-7 | 144.8 | 197.4 | 52.6 | 10.30 | 0.45 | 0.960 | 24.3 | 183 | 33.6 |
| CEx-12 | 56.3 | 251.8 | 195.5 | 10.30 | 0.30 | 0.950 | 23.2 | 442 | 32.9 |
| Ex-8 | 155.3 | 249.8 | 94.8 | 11.76 | 0.30 | 0.948 | 24.7 | 462 | 55.3 |
| CEx-13 | 204.3 | 236.7 | 32.4 | 9.60 | 0.35 | 0.943 | 23.0 | 373 | 8.3 |
| CEx-14 | 204.5 | 236.4 | 31.9 | 9.53 | 0.35 | 0.944 | 22.7 | 370 | 113.0 |

| | Character printing | | | | Solid printing | | | | | |
|---|---|---|---|---|---|---|---|---|---|---|
| | Clarity | Skipping | Thickness | Thickness unevenness | Clarity | Size correspondence | Dark and light unevenness | Sticking to base sheet | Sensitivity | Number of printable copies |
| CEx-1 | A | X | X | ○ | X | X | X | ○ | H | >2800 |
| CEx-2 | A | Δ | ○ | ○ | Δ | Δ | ○ | ○ | 3H | 2500 |
| CEx-3 | B | X | X | ○ | X | X | X | ○ | H | >2800 |
| CEx-4 | A | ○ | ○ | ○ | Δ | ○ | ○ | ○ | 3H | 2400 |
| CEx-5 | A | ○ | ○ | ○ | Δ | Δ | ○ | X | 4H | 2200 |
| CEx-6 | B | ○ | X | X | X | X | ○ | X | 5H | 1300 |
| CEx-7 | A | ○ | ○ | ○ | Δ | Δ | ○ | ○ | 3H | 2300 |
| CEx-8 | A | Δ | ○ | ○ | Δ | Δ | X | ○ | 2H | 2700 |
| Ex-1 | A | ○ | ○ | ○ | Δ | ○ | ○ | ○ | 3H | 2650 |
| Ex-2 | A | ○ | ○ | ○ | ○ | ○ | ○ | ○ | 5H | 2600 |
| Ex-3 | A | ○ | ○ | ○ | ○ | ○ | ○ | ○ | 4H | 2500 |
| Ex-4 | A | ○ | ○ | ○ | ○ | ○ | ○ | ○ | 3H | 2350 |
| CEx-9 | A | Δ | X | ○ | ○ | Δ | ○ | ○ | 2H | 2250 |
| CEx-10 | B | ○ | X | X | Δ | Δ | ○ | X | 5H | 1500 |

TABLE 1-continued

| | | | | | | | | | | |
|---|---|---|---|---|---|---|---|---|---|---|
| CEx-11 | A | ○ | ○ | ○ | Δ | Δ | ○ | X | 2H | 2400 |
| Ex-5 | A | ○ | ○ | ○ | ○ | ○ | ○ | ○ | 4H | 2000 |
| Ex-6 | A | ○ | ○ | ○ | ○ | ○ | ○ | ○ | 2H | >2800 |
| Ex-7 | A | ○ | ○ | ○ | ○ | ○ | ○ | ○ | 5H | 2400 |
| CEx-12 | C | ○ | X | X | Δ | Δ | ○ | ○ | 3H | 1600 |
| Ex-8 | A | ○ | ○ | ○ | ○ | Δ | ○ | ○ | 3H | 2100 |
| CEx-13 | — | — | — | — | — | — | — | — | — | — |
| CEx-14 | B | ○ | ○ | X | ○ | Δ | X | ○ | H | 1800 |

The resulting biaxially stretched film having a thickness of 1.8 micrometers was laminated to a polyester gauze (made of polyethylene terephthalate fibers). A printing plate was prepared and applied to a printing press. The print was evaluated, and the results were shown in Table 1.

COMPARATIVE EXAMPLES 13 AND 14

Inert particles included in the films were changed to 0.2% by weight of kaolinite having an average particle diameter of 9.7 micrometers (Comparative Example 13) or weight of spherical silica having an average particle diameter of 2.5 (Comparative Example 14). Otherwise, the same procedure as in Example 2 was carried out a film was prepared and biaxially stretched. The resulting biaxially stretched film (thickness 1.8 micrometers) was laminated to a polyester gauze of polyethylene terephtalate, and a printing plate was prepared and processed on a printing press. Weight of spherical silica having an average particle diameter of 2.5 micrometers.

In Comparative Example 13, heavy creasing formed during film wind up and, plate-making and evaluation of printing were not performed.

We claim:

1. A film for a thermosensitive stencil printing base sheet having a planar orientation coefficient of 0.90 to 0.98, comprising a biaxially stretched film of a thermoplastic resin having a thickness of 0.2 to 7 micrometers, said film showing at least two fusion peaks in its DSC temperature elevation measuring chart (the rate of temperature elevation 20° C./min.), at least two fusion peaks having the following relation:

$$T_{mp}\,(\max) \leqq 260\ (^\circ C.)$$

$$T_{mp}\,(\min) \geqq 90\ (^\circ C.)$$

$$\Delta T_{mp} \geqq 10\ (^\circ C.)$$

$$5(\text{cal/g}) \leqq \Delta Hu\ (\text{total}) \leqq 13\ (\text{cal/g})$$

$$0.05 \leqq \Delta Hu(\min)/\Delta Hu\ (\text{total}) \leqq 0.9$$

wherein $T_{mp}$ (max) is the temperature (°C.) of the fusion temperature on the highest temperature side, $T_{mp}$ (min) is the temperature (°C.) of fusion peak on the lowest temperature side, $\Delta T_{mp}$ is $T_{mp}$ (max)$-T_{mp}$ (min), ΔHu(total) is the total fusion energy (cal/g), and ΔHu(min) is the fusion energy (cal/g) of the fusion peak on the lowest temperature side.

2. The film of claim 1 in which $T_{mp}$ (max) is not more than 250° C.

3. The film of claim 1 in which $T_{mp}$ (min) is at least 100° C.

4. The film of claim 1 in which the $\Delta T_{mp}$ is at least 20° C.

5. The film of claim 1 in which the ΔHu (total) is 6 to 12 ) cal/g.

6. The film of claim 1 in which the ΔHu(min)/ Hu (total) is from 0.15 to 0.8.

7. The film of claim 1 which has a thickness of 0.5 to 5 micrometers.

8. The film of claim 1 which has a thermal shrinkage of at least 10% at a temperature of $T_{mp}$ (max)$-$20° C.

9. The film of claim 1 which has a tensile modulus of at least 100 kg/mm$^2$.

10. The film of claim 1 which has a centerline average roughness (Ra) by a non-contacting three dimensional roughness of 10 to 100 nm.

11. The film of claim 1 which is obtained by melt-molding a blend of at least two thermoplastic polymers having a different temperatures ($T_{mp}$, °C.) of fusion peaks in a DSC temperature elevation measuring chart (temperature elevation speed 20° C./min).

12. The film of claim 11 which is obtained by melt-molding from blend of two thermoplastic polymers showing a difference in $T_{mp}$ is at least 20° C..

13. The film of claim 12 which is obtained by melt-molding a blend of thermoplastic polymers composed of aromatic polyesters having a $T_{mp}$ of 255 to 190° C. and a thermoplastic polymer having a $T_{mp}$ of 130 to 225° C..

14. The film of claim 13 in which the thermoplastic polymer is an aromatic polyester.

* * * * *